United States Patent
Lee et al.

(10) Patent No.: US 9,062,592 B2
(45) Date of Patent: Jun. 23, 2015

(54) GLOW PLUG AND ELECTRIC THERMOSTAT WITH THE SAME

(71) Applicants: Hyundai Motor Company, Seoul (KR); Kia Motors Corporation, Seoul (KR); Inzicontrols Co., Ltd., Siheung-si (KR)

(72) Inventors: Philgi Lee, Suwon-si (KR); Gyuhwan Kim, Suwon-si (KR); Jae Suk Park, Suwon-si (KR); Yong Jeong Kim, Ansan-si (KR)

(73) Assignees: HYUNDAI MOTOR COMPANY, Seoul (KR); KIA MOTORS CORPORATION, Seoul (KR); INZICONTROLS CO., LTD., Siheung-Si (KR)

( * ) Notice: Subject to any disclaimer, the term of this patent is extended or adjusted under 35 U.S.C. 154(b) by 250 days.

(21) Appl. No.: 13/729,656

(22) Filed: Dec. 28, 2012

(65) Prior Publication Data

US 2013/0263799 A1    Oct. 10, 2013

(30) Foreign Application Priority Data

Apr. 9, 2012   (KR) .................. 10-2012-0036933

(51) Int. Cl.
*F01P 7/16* (2006.01)
*F01P 7/00* (2006.01)
*H05B 1/02* (2006.01)
*G05D 23/30* (2006.01)
*F01P 7/14* (2006.01)

(52) U.S. Cl.
CPC ............... *F01P 7/16* (2013.01); *F01P 2070/10* (2013.01); *F01P 7/14* (2013.01); *F01P 7/167* (2013.01); *F01P 7/00* (2013.01); *H05B 1/0227* (2013.01); *F01P 2070/04* (2013.01); *G05D 23/30* (2013.01)

(58) Field of Classification Search
CPC ............... F01P 7/16; F01P 7/167; F01P 7/14; F01P 2070/04; F01P 2070/10
USPC ....... 123/145 A, 143 B, 143 C, 179.6, 169 R, 123/145 R, 41.08, 41.32, 41.33; 291/270, 291/267, 541, 544; 361/264
See application file for complete search history.

(56) References Cited

U.S. PATENT DOCUMENTS 6,064,039 A *   5/2000  Kumada ................... 219/270
6,483,079 B2   11/2002  Sato et al.
7,420,139 B2 *  9/2008  Yoshikawa et al. ........... 219/270

(Continued)

FOREIGN PATENT DOCUMENTS

JP    07-167434 A    7/1995
JP    07-293417 A    11/1995

(Continued)

*Primary Examiner* — Mahmoud Gimie
(74) *Attorney, Agent, or Firm* — Morgan, Lewis & Bockius LLP

(57) ABSTRACT

A glow plug may include: i) a hollow plug housing that is mounted on a plug mount in an insulation status; ii) a center shaft that is fixed to one end of the plug housing in an insulation status and receives power from the outside; iii) a heating unit that is connected to the center shaft and the other end of the plug housing, and generates heat using a potential difference; and iv) a connecting unit that insulates the plug mount and the center shaft, is coupled to the plug mount, and electrically connects with center shaft with the plug housing.

17 Claims, 8 Drawing Sheets

(56) References Cited

U.S. PATENT DOCUMENTS

| | | | |
|---|---|---|---|
| 2010/0122975 A1* | 5/2010 | Burrows et al. | 219/267 |
| 2010/0133253 A1* | 6/2010 | Walker, Jr. | 219/270 |
| 2011/0180525 A1* | 7/2011 | Vedel et al. | 219/270 |
| 2013/0263800 A1* | 10/2013 | Lee et al. | 123/41.08 |
| 2014/0041603 A1* | 2/2014 | Lee | 123/41.08 |

FOREIGN PATENT DOCUMENTS

| | | | | |
|---|---|---|---|---|
| JP | 2003-201844 A | | 7/2003 | |
| JP | 2003-239745 A | | 8/2003 | |
| JP | 2004-137981 A | | 5/2004 | |
| JP | 2005155831 A | * | 6/2005 | F16K 31/68 |

* cited by examiner (a)  (b)

GLOW PLUG AND ELECTRIC THERMOSTAT WITH THE SAME

CROSS-REFERENCE TO RELATED APPLICATION

The present application claims priority of Korean Patent Application Number 10-2012-0036933 filed Apr. 9, 2012, the entire contents of which application is incorporated herein for all purposes by this reference.

BACKGROUND OF INVENTION

1. Field of Invention

An exemplary embodiment of the present invention relates to an electric thermostat of a cooling system in a vehicle, More particularly, the present invention relates to a glow plug that allows the heating temperature of an electric thermostat to rapidly reach a desired temperature.

2. Description of Related Art

In general, thermostats for vehicles can be disposed between an engine and a radiator, and function to maintain a coolant at an appropriate temperature by automatically opening/closing in accordance with a change in temperature of the coolant and controlling the flow rate of the coolant flowing to the engine.

In the related art, most of thermostats for vehicle are mechanical thermostat structured such that the expansion force of was, which expands in accordance with the temperature of a coolant, is transmitted to a piston and a valve is opened/closed by the force.

However, such mechanical thermostats operates in the way of operating in accordance with opening/closing temperatures set as regulation temperatures of a coolant, that is, in the way of simply opening/closing the valve only at predetermined temperatures. Accordingly, considering the recent tendency that the performance and efficiency of vehicles are gradually increased, there is a limit in actively dealing with changes in driving circumstances and other conditions.

Currently, variable control types of electric thermostats that maintain the temperature of the engine coolant in an optimal status while making up for the drawbacks of the mechanical thermostats have been developed, The electric thermostats can keep an engine optimally cooled, by controlling the temperature of the engine coolant in accordance with the driving circumstances such as the status of load applied to the vehicle, and can be expected to improve fuel efficiency and reduce exhaust gas in comparison to the mechanical thermostats.

An example of the electric thermostats has a structure in which wax and a film resistance type of film are included, heat is generated by a heater supplied with power, the wax is expanded by the heat of the heater, and a piston is pushed by the expansion force, such that a value is operated.

The electric thermostats using the film resistance type of heater or other heaters in the related art take 50~70 seconds to reach a desired temperature of 300-350° C.

Therefore, there is a problem in the related art in that as it takes a lot of time to increase the heating temperature of the heater to a desired temperature, it is difficult to control the temperature of the coolant in real time and it is also difficult to improve fuel efficiency of a vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a glow plug having advantages of being able to he used as a heater that generates heat and to be mounted on a plug mount made of a non-conductive material in an electric thermostat.

Various aspects of the present invention provide for an electric thermostat that can minimize that time for increasing the heating temperature of a heater to a desired temperature, control the temperature of a coolant in real time in accordance with the driving conditions of a vehicle by improving control responsiveness, and maximize fuel efficiency of the vehicle.

Various aspects of the present invention provide for a glow plug that may include: i) a hollow plug housing that is mounted on a plug mount in an insulation status; ii) a center shaft that is fixed to one end of the plug housing in an insulation status and receives power from the outside; iii) a heating unit that is connected to the center shaft and the other end of the plug housing, and generates heat using a potential difference; and iv) a connecting unit that insulates the plug mount and the center shaft, is coupled to the plug mount, and electrically connects with center shaft with the plug housing.

The connecting unit may include: a connector that is integrally coupled to the plug and has integral positive (+) and negative (−) terminal members; a first terminal coupler that is fitted in the connector, electrically connected with the positive (+) terminal member, and coupled with the center shaft; and a second terminal coupler that is fitted in the connecter, separately from the first terminal connector, electrically connected with the negative (−) terminal member, and coupled with one end of the plug housing.

The heating unit may include: a heating tube that is coupled to the other end of the plug housing; and a coil unit that has one end connected to the center shaft in the heating tube and the other end connected to the heating tube.

Various aspects of the present invention provide for a glow plug that may be fixed to a predetermined plug mount and may include: i) a hollow plug housing that is mounted on a plug mount, insulated from the plug mount; ii) a center shaft that is fixed to one end of the plug housing, insulated from the plug housing, and receives power from the outside; iii) a heating tube that is coupled to the other end of the plug housing; iv) a coil unit that has one end connected to the center shaft in the heating tube and the other end connected to the heating tube; v) a connector that insulates the plug mount and the center shaft, is coupled to the plug mount, and has integral positive (+) and negative (−) terminal member; vi) a first terminal coupler that is fitted in the connector, electrically connected with the positive (+) terminal member, and coupled with the center shaft; and vii) a second terminal coupler that is fitted in the connecter, separately from the first terminal connector, electrically connected with the negative (−) terminal member, and coupled with one end of the plug housing.

The plug housing may be coupled with the second terminal coupler with a predetermined gap from the inner circumference of the plug mount.

A spacing that spaces the plug housing may be formed at the plug mount.

One end of the plug housing may be coupled to the center shaft through a sealing member.

The center shaft and the second terminal coupler may be insulated by an insulating washer.

A first elastic deformable portion that elastically presses the center shaft may be integrally formed at the first terminal coupler.

A second elastic deformable portion that elastically presses one end of the plug housing may be integrally formed at the second terminal coupler.

The first terminal coupler may be formed in a cylindrical Shape and may have a first cutting line that is longitudinally formed to be long in order to apply an elastic force to the connector.

The second terminal coupler may he formed in a cylindrical shape and may have a second cutting line that is longitudinally formed to be long in order to apply an elastic force to the connector.

A first connection groove connected with the positive (+) terminal member may be formed at the first terminal coupler.

A second connection groove connected with the negative terminal member may be formed at the second terminal coupler.

The coil unit may include a heating coil with one end connected to the heating tube and the other rend connected to the center shaft.

The coil unit may include: a heating coil that is connected to the heating tube and generates heat; and a temperature control coil that is connected to the heating coil and the center shaft and controls a heating temperature of the heating coil.

Various aspects of the present invention provide for an electric thermostat that controls the temperature of a coolant for an engine of a vehicle and may include i) a valve housing that is connected with a plurality of channels through which the coolant for an engine flows; ii) a wax case that is disposed in the valve housing and has a wax space; iii) a glow plug that is inserted in wax filled in the wax space and generates heat by receiving power from the outside; iv) a driving body that is moved by expansion of the wax due to heat from the glow plug; and v) a valve assembly that opens/closes the channels by the movement of the driving body, in which the glow plug may be electrically connected with the power, insulated from the valve housing.

The glow plug may include: a cylindrical plug housing that is mounted on a plug mount integrally formed with the valve housing, in an insulation status; a center shaft that is fixed to one end of the plug housing in an insulation status and receives power from the outside; a heating unit that is connected to the center shaft and the other end of the plug housing, and generates heat using a potential difference; and a connecting unit that insulates the plug mount and the center shaft, is coupled to the plug mount, and electrically connects with center shaft with the plug housing.

The connecting unit may include: a connector that is integrally coupled to the plug and has integral positive (+) and negative (−) terminal members; a first terminal coupler that is fitted in the connector, electrically connected with the positive (+) terminal member, and coupled with the center shaft; and a second terminal coupler that is fitted in the connecter, separately from the first terminal connector, electrically connected with the negative (−) terminal member, and coupled with one end of the plug housing.

According to various aspects of the present invention, the glow plug may be disposed on the plug mount in an insulation status and can electrically connect the center shaft with the heating tube through the first and second terminal coupler of the connecting unit.

Since the glow plug can also be mounted on a plug mount made of a non-conductive material, unlike common plugs in which positive (+) power is connected to a plug body and negative (−) power is connected to the plug mount 1 made of a conductive material, it is possible to remove the limit conditions of the material of the plug mount.

Since the glow plug is used as a heater that generates heat, it is possible to minimize the time for increasing the temperature of the heater to the desired temperature.

Since it is possible to control the temperature of the coolant in real time in accordance with the driving conditions of a vehicle, it is possible to increase fuel efficiency of the vehicle as much as possible by controlling the temperature of the coolant in real time.

The methods and apparatuses of the present invention have other features and advantages which will he apparent from or are set forth in more detail in the accompanying drawings, which are incorporated herein, and the following Detailed Description, which together serve to explain certain principles of the present invention.

DETAILED DESCRIPTION

Figure 1:
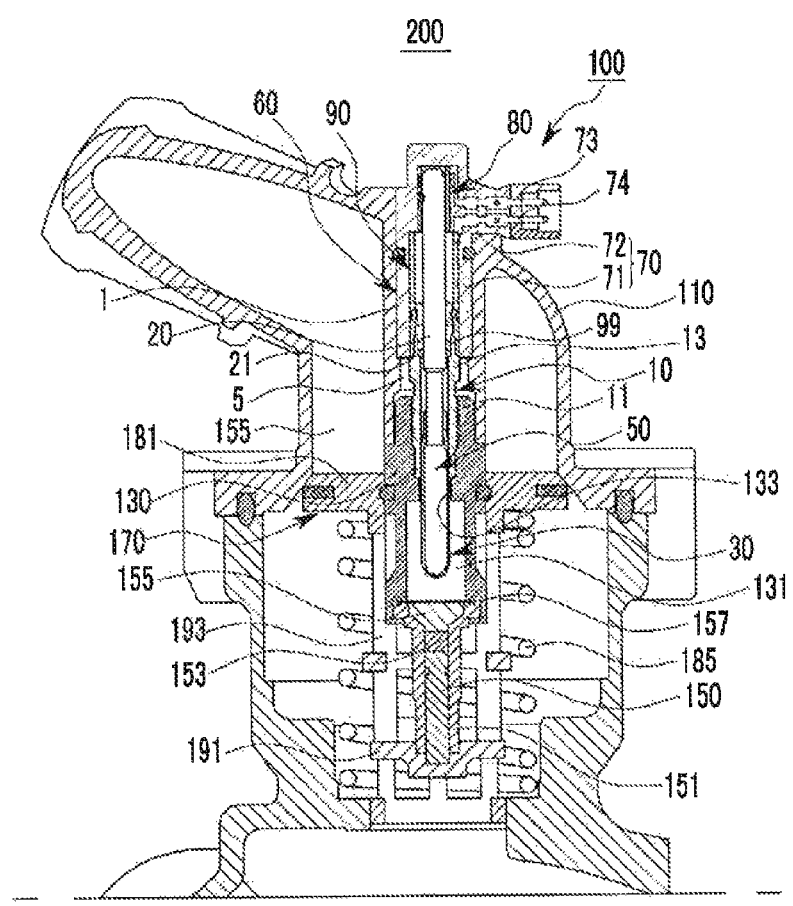
FIG. 1 is a cross-sectional view showing the configuration of an exemplary electric thermostat where a glow plug is applied, according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Components unrelated to the description will be omitted in order to obviously describe the present invention, and like reference numerals will be used to describe like components throughout the present specification.

Further, in the drawings, the sizes and the thicknesses of the components are exemplarily provided for the convenience of description, the present invention is not limited those shown in the drawings, and the thicknesses are exaggerated to clearly show several parts and regions.

Terms used in the specification, giving the names of the components in 'first', 'second', 'third', etc is for discrimination them because the names are the same and they are not limited to the order.

FIG. 1 is a cross-sectional view showing the configuration of an electric thermostat where a glow plug is applied, according to various embodiments of the present invention.

Referring to FIG, 1, a glow plug 100 according to various embodiments of the present invention may be generally used to heat air in advance to help ignition of fuel in a diesel engine.

However, the glow plug 100 according to various embodiments of the present invention may be applied to a heater that is fixed to a flog mount 1, generates heat in response to an electric signal, and provides heat around the plug mount 1.

For example, the glow plug 100 according to various embodiments of the present invention may be applied to a heater of an electric thermostat 200 that maintain the temperature of an engine coolant in an optimal state.

The electric thermostat 200 is structured to making the heater generate heat by receiving power, expanding wax by using the heat of the heater, and operating a valve by pushing a driving body such as a piston.

Meanwhile, various embodiments of the present invention provide the glow plug 100 that can also be mounted on a plug mount 1 made of a non-conductive material, unlike common plugs in which positive (+) power is connected to a plug body and negative (−) power is connected to the plug mount 1 made of a conductive material.

That is, since the plug mount 1 should be made of a conductive material to ground the negative (−) power, in common glow plugs, there is a limit in use in accordance with the material of the plug mount 1.

Figure 2:
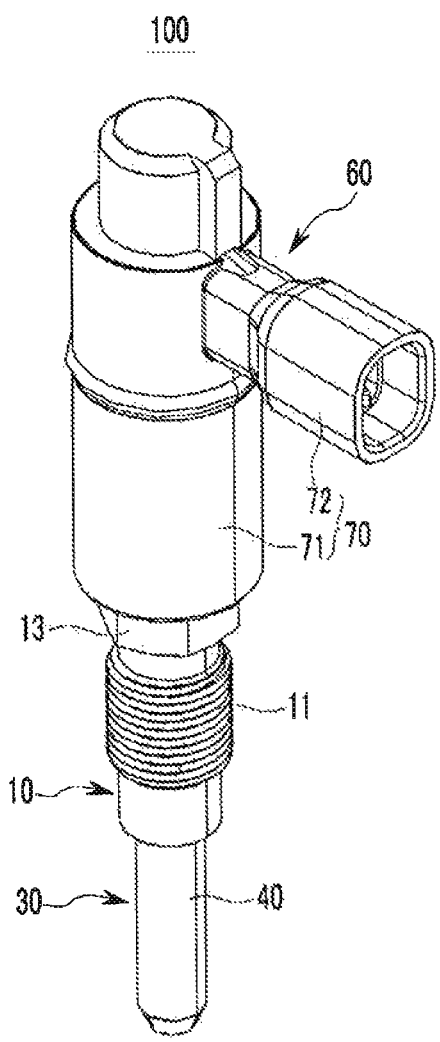
FIG. 2 is a perspective view showing an exemplary glow plug that is applied to an electric thermostat according to the present invention.
Figure 3:
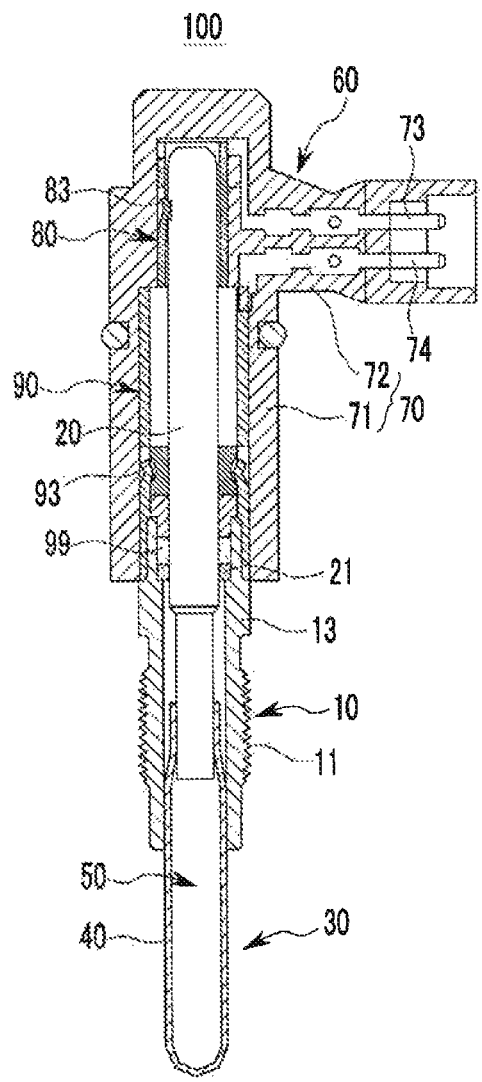
FIG. 3 is a cross-sectional view showing the configuration of the glow plug that is applied to an exemplary electric thermostat according to the present invention.

FIG. 2 is a perspective view showing a glow plug that is applied to an electric thermostat according to various embodiments of the present invention and FIG. 3 is a cross-sectional view showing the configuration of the glow plug that is applied to an electric thermostat according to various embodiments of the present invention.

Referring to FIGS. 1 to 3, the glow plug 100 in various embodiments of the present invention basically includes a plug housing 10, a center shaft 20, a heating unit 30, and a connecting unit 60.

In various embodiments of the present invention, the plug housing is provided to mount the components of the glow plug 100 and may be mounted on the plug mount 1 that fixes the entire glow plug 100.

For example, the plug mount 1 may be integrally and/or monolithically formed with a valve housing 110, which may be made of various materials and is connected to a plurality of channels through which an engine coolant flows, and may be made of a non-conductive material.

The plug housing 10 is formed in a hollow case shape with the top and bottom open in the drawings, is mounted in the space inside the plug mount 1, insulated from the plug mount 1, and may be provided as a grounding main body that receives negative (−) power from the outside.

A thread 11 to be thread-fastened to a predetermined element is formed on the outer surface of the plug housing 10 and a hexagonal head 13 is formed at the top of the plug housing 10, so that the plug housing 10 having this structure is called a vault in this field.

A spacing 5 for insulating the inner circumference of the plug mount 1 and the plug housing 10 may be formed on inner circumference of the plug mount 1.

The spacing 5 spaces the inner circumference of the plug mount 1 at a predetermined distance from the plug housing 10 while the inner circumference of the plug mount 1 is cut, when the plug mount 1 is made of metal.

Further, the spacing 5 may space the inner circumference of the plug mount 1 at a predetermined distance from the plug housing 10 by injection molding, when the plug mount 1 is made of plastic.

The center shaft 20 is a core that receives positive (+) power from the outside and may be fixed to one end (the top in the drawings) of the plug housing 10, insulated from the plug housing 10.

The center shaft 20 may be connected with one end of the plug housing 10 through a sealing member 21. For example, the sealing member 21 may be an O-ring.

Figure 4:
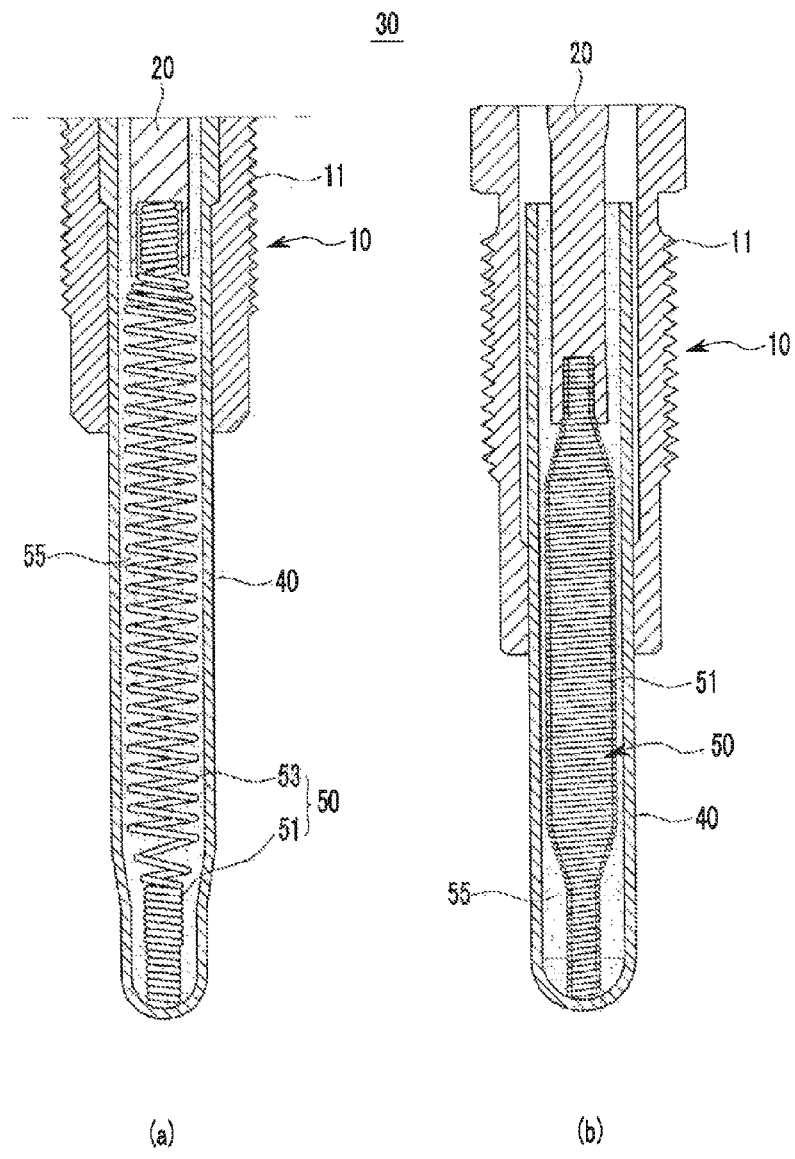
FIG. 4 is a cross-sectional view schematically showing the configuration of an exemplary heating unit that is applied to a glow plug of an electric thermostat according to the present invention.

In various embodiments of the present invention, the heating unit 30 is provided to generates heat, using a potential difference, by receiving power rough the center shall 20 and the plug housing 10, and includes a heating tube 40 and a coil unit 50, as shown in FIG. 4.

The heating tube 40 is formed in a cylindrical shape with the upper end open and the lower end dosed, in the drawings, in which the upper end is inserted in the other end. (lower end in the drawings) of the plug housing 10 or may be coupled to the other end of the plug housing 10.

The heating tube 40 may he forcibly fitted in the other end of the plug housing 10 may be attached to the other end of the plug housing 10 by welding.

Further, the lower end of the center shaft 20 may be inserted in the open upper end of the heating tube 40, insulated from the heating tube 40, and the lower end of the heating tube 40 may be curved by swaging.

The coil unit 50 generates heat, using a potential difference of the power applied from the outside, is disposed in the heating tube 40, and has on end connected to the lower end of the center shaft 20 and the other end connected to the lower end of the heating tube 40.

The coil unit 50, as in (a) of FIG, 4, may include a heating coil 51 connected with the lower end of the heating tube 40 and generating heat, and a temperature control coil 53 connected with the heating coil 51 and the lower end of the center shaft 2.0 an controlling the heating temperature of the heating coil 51.

The heating coil 51 may be fixed to the inner circumference of the lower end of the heating tube 40 by laser welding and the temperature control coil 53 may be fixed to the lower end of the center shaft 20 by calking or laser welding.

The temperature control coil 53 functions to keep the heating temperature of the heating coil 51 constant by controlling an crease in temperature due to a change in resistivity in accordance with an increase in temperature of the heating coil 51.

In this configuration, the heating coil 51 and the temperature control coil 53 are integrally connected, in which the heating coil 51 is made of a material with large electric resistance and the temperature control coil 53 may be made of a material with small electric resistance in comparison to the heating coil 51.

Alternatively, the coil unit 50 may be implemented only by the heating coil 51 that generates heat, using power applied from the outside, as a modified example, as in (b) of FIG. 4.

In this case, one end of the heating coil 51 may be connected to the inner circumference of the lower end of the heating coil 40 by laser welding and the other end of the heating coil 51 may be fixed to the lower end of the center shaft 20 by calking or laser welding.

An insulating member 55 may be disposed in the space between the heating tube 40 and the coil unit 50, inside the heating tube 40.

For example, the insulating member 55 may be magnesium oxide (MgO) powder. The magnesium oxide powder, an insulator, functions to keep the insulation between the heating tube 40 and the coil unit 50, prevent movement of the coil unit 50, and transmit the heat generated from the heating coil 51 of the coil unit 50 to the heating tube 40, In various embodiments of the present invention, the connecting unit 60, as stated above, is provided to electrically connect the center shaft 20 with the plug housing 10, and may insulate the plug mount 1 from the center shaft 20 and may be disposed on the plug mount 1.

Figure 5:
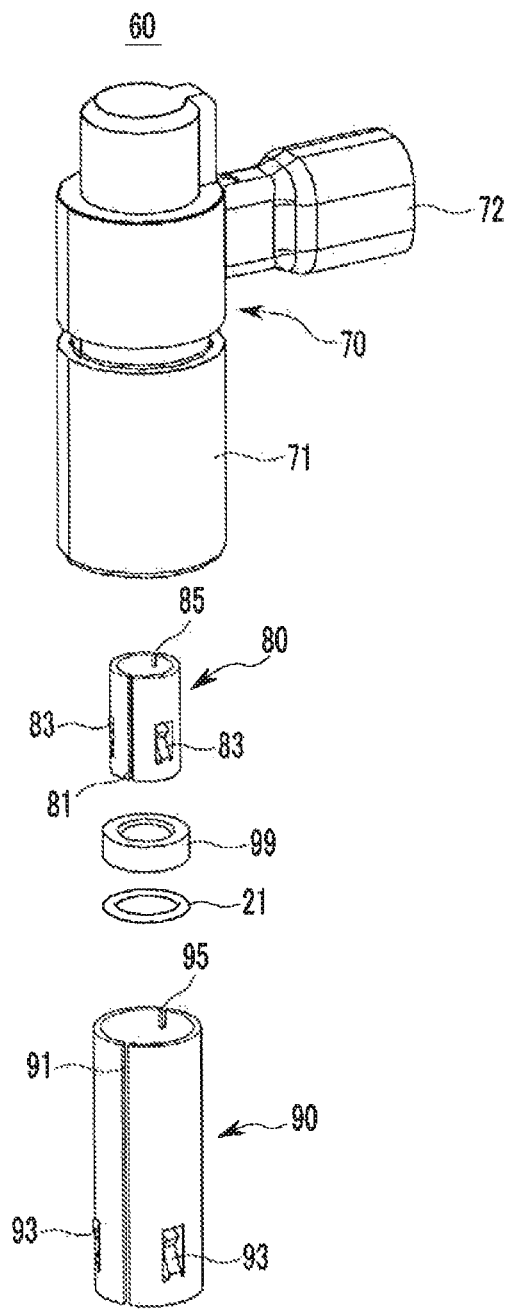
FIG. 5 is an exploded perspective view showing an exemplary y connecting unit that is applied to a glow plug of an electric thermostat according to the present invention.

FIG. 5 is an exploded perspective view showing a connecting unit that is applied to a glow plug of an electric thermostat according to various embodiments of the present invention.

Referring to FIGS, 1 to 5, the connecting unit 60 according to various embodiments of the present invention includes a connector 70, a first terminal coupler 80, and a second terminal coupler 90.

In various embodiments of the present invention, the connector 70, which is inserted in the plug mount 1, at the upper end of the plug mount 1, may be coupled to the plug mount 1, insulating the plug mount 1 from the center shaft 20.

Figure 6:
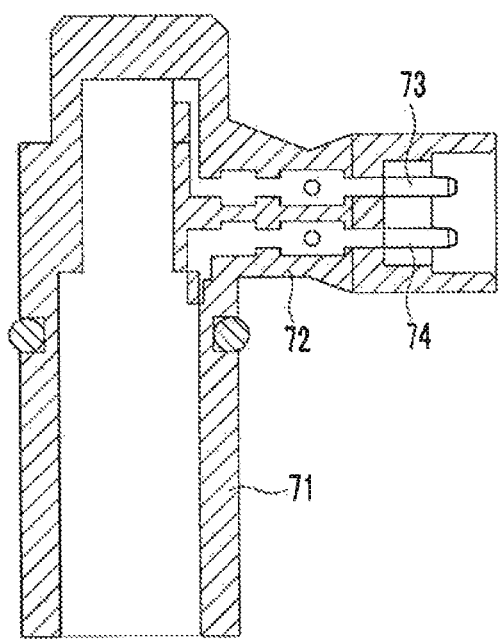
FIG. 6 is a cross-sectional view showing the configuration of an exemplary connector of a connecting unit that is applied to a glow plug of an electric thermostat according to the present invention.

FIG. 6 is a cross-sectional view showing the configuration of a connector of a connecting unit that is applied to a glow plug of an electric thermostat according to various embodiments of the present invention.

Referring to FIGS. 1 to 6, the connector 70 according to various embodiments of the present invention is made of a plastic material, which is an insulating material, and includes a first portion 71 actually inserted in the plug mount 1 and a second portion 72 integrally and/or monolithically formed with the first portion 71, perpendicular to the first portion 71.

The second portion 72 has integral positive (+) and negative (−) terminal members 73 and 74 and the connector 70 may be injection-molded to the terminal members 73 and 74.

Figure 7:
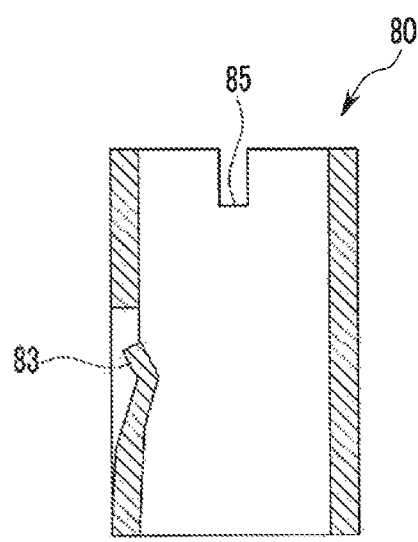
FIG. 7 is a cross-sectional view showing the configuration of an exemplary first terminal coupler of a connecting unit that is applied to a glow plug of an electric thermostat according to the present invention.

FIG. 7 is a cross-sectional view showing the configuration of a first terminal coupler of a connecting unit that is applied to a glow plug of an electric thermostat according to various embodiments of the present invention.

Referring to FIGS. 1 to 7, the first terminal coupler 80 according to various embodiments of the present invention is electrically connected with the center shaft 20 and the positive (+) terminal member 73 and may be fitted in the uppermost portion of the first portion 71 of the connector 70.

Further, the first terminal coupler 80 has a hollow cylindrical shape and is made of a conductive material, and the upper end of the center shaft 20 may be inserted in the first terminal coupler.

The first terminal coupler 80 may generate an elastic force against the first portion 71 in close contact with the inner circumference of the first portion 71, when inserted in the first portion 71 of the connector 70. A long first cutting line 81 is formed longitudinally from the upper end to the lower end of the first terminal coupling 80.

Further, a plurality of elastic deformable portions 83 for elastically pressing the upper end of the center shaft 20 is integrally and/or monolithically formed with the first terminal coupler 80.

The first elastic deformable portions 83 are formed by cutting a portion of the first terminal coupler 80 to have predetermined wave shapes, so that they can press the center shaft 20 by elastically deforming, when the upper end of the center shaft 20 is inserted into the first terminal coupler 80.

Further, a first connection groove 85 connected with the positive (+) terminal member 73 of the connector 70, which is stated above, is formed at the first terminal coupler 80.

That is, when the first terminal coupler 80 is inserted into the first portion 71 of the connector 70, the positive (+) terminal member 73 can be electrically connected with the first terminal coupler 80 while being fitted into the first connection groove 85.

Figure 8:
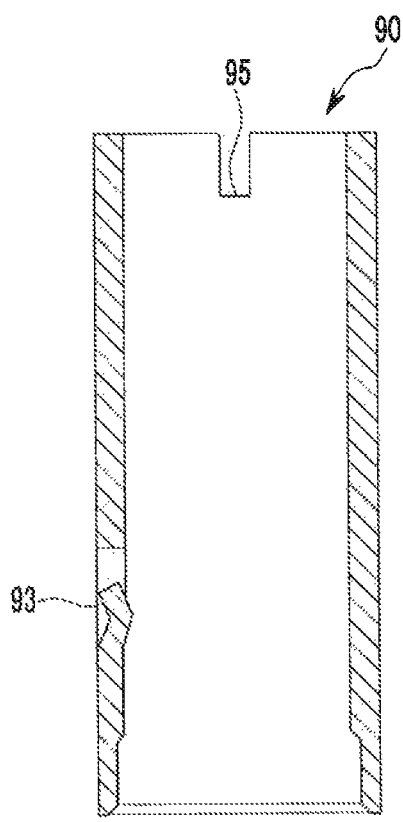
FIG. 8 is a cross-sectional view showing the configuration of an exemplary second connector of a connecting unit that is applied to a glow plug of an electric thermostat according to the present invention.

FIG. 8 is a cross-sectional view showing the configuration of a second connector of a connecting unit that is applied to a glow plug of an electric thermostat according to various embodiments of the present invention.

Referring to FIGS. 1 to 8, a second terminal coupler 90 according to various embodiments of the present invention is electrically connected with the negative (−) terminal member 74 and the plug housing 10 and may be fitted in the first portion 71 of the connector 70, separately from the first terminal coupler 80.

The second terminal coupler 90 has a hollow cylindrical shape and is made of conductive material, and one end of the plug housing 10 (upper end in the drawings) may be inserted in the second terminal coupler.

In this configuration, the second terminal coupler 90 and the center shaft 20 coupled to the first terminal coupler 80 may be insulated by an insulating washer 99.

Further, the plug housing 10 described above may be coupled to the second terminal coupler 90 with a predetermined gap from the inner circumference of the plug mount 1 by the spacing 5 of the plug mount 1, which is described above.

Meanwhile, the second terminal coupler 90 may generate an elastic force against the first portion 71 in close contact with the inner circumference of the first portion 71, when inserted in the first portion 71 of the connector 70. For this configuration, a long second cutting line 91 is formed longitudinally from the upper end to the lower end of the second terminal coupler 90.

Further, a plurality of second elastic deformable portions 93 for elastically pressing one end of the plug housing 10 is integrally and/or monolithically formed with the second terminal coupler 90.

The second elastic deformable portions 83 are formed by cutting a portion of the second terminal coupler 90 to have predetermined wave shapes, so that they can press the plug housing 10 by elastically deforming, when one end of the plug housing 10 is inserted into the second terminal coupler 90.

Further, a second connection groove 95 connected with the negative (+) terminal member 74 of the connector 70, which is stated above, is formed at the second terminal coupler 90.

That is, when the second terminal coupler 90 is inserted into the first portion 71 of the connector 70, the negative (−) terminal member 74 can be electrically connected with the second terminal coupler 90 while being fitted into the second connection groove 95.

The glow plug 100 according to various embodiments of the present invention Which is described above is disposed on the plug mount 1 in an insulation status, and can electrically connect the center shaft 20 with the heating tube 40 through the first and second terminal connector 80 of the connecting unit 60.

Therefore, in various embodiments of the present invention, unlike common glow plugs in which the positive (+) power is connected to the plug main body and the negative (−) power is connected to the plug mount 1 made of a conductive material, the glow plug 100 can be mounted even on the plug mount 1 made of a non-conductive material, so that it is possible to remove the limit conditions of the material of the plug mount 1.

The configuration of thermostat 200 where the glow plug according to various embodiments of the present invention which has the configuration described above is described in detail with reference FIG. 1.

Referring to FIG. 1, an electric thermostat 200 according to various embodiments of the present invention, which controls the temperature of an engine coolant of a vehicle, can operate a valve by making a heater generate heat by receiving power, expanding was by using the heat from the heater, and pushing a driving body such as a piston.

The electric thermostat 200 according to various embodiments of the present invention has a structure that can rapidly increase the temperature of the heater to a desired temperature by using the glow plug 100 described above, as a heater generating heat.

The electric thermostat 200 according to various embodiments of the present invention basically includes a valve housing 110, a wax case 130, the glow plug 100 described above, a driving body 150, and a valve assembly 170.

In various embodiments of the present invention, the valve housing 110 is a part connected with a plurality of channels through which an engine coolant of a vehicle flows.

For example, the valve housing 110 may be connected with a radiator-sided channel through which a coolant flowing inside through a radiator, a bypass channel through which the coolant directly circulates to a water pump of an engine without circulating the radiator, and a water pump-sided channel at the inlet through which the coolant flows into the engine.

The plug mount 1 where the glow plug 100 according to various embodiments of the present invention is integrally and/or monolithically formed with the valve housing 110, as a heater that generates heat by receiving power.

The valve housing 110 may be made of a conductive material with the plug mount 1 or may be made of a non-conductive material.

In various embodiments of the present invention, the wax case 130 may he inserted in the plug mount 1 inside the valve housing 110 and coupled to the plug housing 10 of the glow plug 100.

In this case, the wax case 130 may be made of metal with excellent heat transmission, and may be inserted in the lower end of the plug mount 1 and thread-fastened to the thread 11 of the plug housing 10, insulated from the plug mount 1.

Further, a wax space that is filled with wax 131 is formed in the wax case 130.

The wax 131 is a common thermally expansive material that changes in volume while being liquefied from a solid state, when heat is applied.

The heating tube 40 of the glow plug 100 is inserted in the wax space of the wax case 130 and provides heat to the wax 131 in the wax space through the heating tube 40, For this configuration, a through-hole 133 is formed at the upper portion of the wax case 130 such that the heating tube 40 can be inserted in the wax space through the through-hole.

When the wax case 130 is inserted in the lower end of the plug mount 1 and thread-fastened to the thread 11 of the plug housing 10, the heating tube 40 can be inserted into the wax space through the through-hole 133.

In various embodiments of the present invention, the glow plug 100 with the heating tube 40 is inserted in the wax space of the wax case 130 functions as a heater that generates heat through the heating tube 40 by receiving power from the outside.

The glow plug 100 is assembled with the plug mount 1, insulated from the plug mount 1 of the valve housing 110 and can connect the center shaft 20 with the plug housing 10 through the connecting unit 60.

The glow plug 100 may be electronically controlled by an external controller such as an ECU (Electronic Control Unit).

The glow plug 100 in various embodiments of the present invention has the configuration described above, so that the configuration and the assembly structure are not described below.

In various embodiments of the present invention, the driving body 150 may be a piston that moves up/down with expansion of the wax 131 by the heat from the glow plug 100.

The driving body 150 may be disposed and moved inside a cylindrical element guide 151 coupled to the lower end (in the drawings) of the wax case 130.

Further, the a rubber movable body 153 may be disposed inside the element guide 151 and on the driving body 150, the upper portion of the rubber movable body 153 may be filled with transmission liquid, and a diaphragm 157 may be disposed between the upper surface of the transmission liquid 155 and the wax 131.

The space filled with the transmission liquid 155 inside the element guide 151 may include an inclining surface having a diameter gradually decreasing toward the lower portion from the upper portion where the diaphragm 157 is disposed.

Therefore, the pressure of the transmission liquid 155 due to deformation of the diaphragm 157 can concentrate on the rubber movable body 153 and the rubber movable body 153 presses the driving body 150 under the rubber movable body, using the force.

Therefore, according to this structure, it is possible to accurately control the flow of the coolant, because the expansion pressure of the wax 131 can be transmitted to the driving body 150 without a loss.

in various embodiments of the present invention, the valve assembly 170 is provided to selectively open/close the channel through which the engine coolant flows by the movement of the driving body 150.

The valve assembly 170 includes a main valve 181, an elastic member 185, and a bypass valve 191.

The main valve 181 is a channel through which the engine coolant by the movement of the driving body 150 and has a function of opening/closing the radiator-sided channel, for example.

The radiator-sided. channel is a channel that allows the coolant discharged from an engine to flow into the engine after circulating a radiator.

The elastic member 185 is disposed on the bottom of the main valve 181 and has a function of elastically supporting the main valve 181 to the radiator-sided channel.

Therefore, unless a force is applied from the outside, the main valve 181 closes the radiator-sided channel by the elastic force of the elastic member 185.

On the other hand, the bypass valve 191 opens/closes a bypass channel, Which does not circulate the radiator, in cooperation with the main valve 181.

The bypass channel is a channel that allows the coolant discharged from the engine to directly flow into a water pump of the engine without passing through the radiator.

The bypass valve 191 is disposed under the driving body 150 and can be moved by pressure of the driving body 150.

Further, main valve 181 and the bypass valve 191 according to various embodiments of the present invention may be integrally connected by a frame 193 (generally called a "valve guide" in the field), in which the bypass valve 191 and the main valve 182 are moved together by the pressure of the driving body 150.

On the other hand, the electric thermostat 200 having the configuration according to various embodiments of the present invention may be disposed at the inlet of the engine through which the coolant flows inside.

However the present invention is not limited to that the electric thermostat 200 is disposed at the inlet of the engine through which the coolant flows inside, and the electric thermostat 200 may be disposed at the outlet of the engine through which the coolant is discharged.

The operation of the electric thermostat 200 having the configuration according to various embodiments of the present invention is described hereafter.

First of all, when the coolant for an engine is maintained at a predetermined temperature, the main valve 181 has closed the radiator-sided channel by the elastic member 185 and the bypass valve 191 has opened the bypass channel, integrally connected with the main valve 181 by the frame 193.

In this status, the coolant discharged from the engine directly flows into the engine through the bypass channel and the water pump-sided channel without passing through the radiator.

In this status, when the temperature of the coolant is increased over a predetermined temperature by the operation of the engine, the ECU gives an instruction of operating the glow plug 100 to open the main valve 181.

Accordingly, external power is applied to the coil unit 50 through the connecting unit 60 of the glow plug 100, the heating coil 51 of the coil unit 50 rapidly increases to the desired temperature.

Therefore, in various embodiments of the present invention, as the heating coil 51 of the coil unit 50 generates heat, the wax 131 increases in volume and the diaphragm 157 being in contact with the wax is deformed by the expansion of the wax 131.

Accordingly, the pressure due to the deformation of the diaphragm 157 is transmitted up to the driving body 150 sequentially through the transmission liquid 155 and the rubber movable body 153. In this process, the driving body 150 applies pressure to the bypass vale 191, moving down, and the bypass valve 191 is correspondingly moved down.

Therefore, as the bypass valve 191 moves down, the bypass channel is closed by the bypass valve 191.

Further, the main valve 181 integrally connected to the frame 193 opens the radiator-sided valve 181, moving down with the bypass valve 191.

Therefore, the coolant discharged from the engine flows to the water pump-sided channel through the radiator-sided channel after circulating the radiator, and flows into the engine. The coolant exchanges heat in the radiator in this process, so that the temperature of the coolant decreases.

On the other hand, when the temperature of the coolant drops to the predetermined temperature or less, the ECU recognizes the drop of temperature and gives an instruction of stopping the operation of the glow plug 100.

Accordingly, the heating coil 51 of the coil unit 50 stops generating heat, the expanded wax 131 contracts, and the driving body 150 moves up.

Therefore, the pressure of the driving body 150 which presses the bypass valve 191 is removed, so that the main valve 181 is moved up by the elastic force of the elastic member 185 and closes the radiator-sided channel and the bypass valve 191 correspondingly opens the bypass channel, moving up.

According to the electric thermostat 200 according to various embodiments of the present invention, which was described above, it is possible to maintain the temperature of the coolant at a predetermined temperature by the ECU electronically controlling the electric thermostat 200.

Further, in various embodiments of the present invention, since it is possible to rapidly reach the desired temperature by using the glow plug 100 as a heater that generates heat, it is possible to rapidly and accurately control the temperature of the coolant.

Comparing with a test result, it takes 50~70 seconds to reach the desired temperature of 300-350° C. in the related art using a film resistance type of heater, However, in various embodiments of the present invention using the glow plug 100 as a heater, it can be seen that it takes 30 seconds or less to reach the desired temperature of 350° C., which is remarkably improved in comparison to the related art.

Further, in various embodiments of the present invention, it is possible to minimize the time taken to increase up to the desired temperature by using the glow plug 100 in the electric thermostat 200 and it is possible to make the features of the cooling system various, by electronically controlling the amount of heat generated by the heater, using the ECU that performs Pulse Width Modulation (PWM) control.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A glow plug comprising:
 a hollow plug housing mounted on a plug mount in an insulation status;
 a center shaft fixed to one end of the plug housing in an insulation status and receives power from the outside;
 a heating unit directly connected to a portion of the center shaft and another end of the plug housing, and generates heat using a potential difference; and
 a connecting unit that insulates the plug mount and the center shaft, is coupled to the plug mount, and electrically connects with center shaft with the plug housing,
 wherein the connecting unit includes:
  a connector integrally coupled to the plug and has integral positive (+) and negative (−) terminal members;
  a first terminal coupler fitted in the connector and coupled between the positive (+) terminal member and another portion of the center shaft, and electrically connecting the positive (+) terminal member and the center shaft; and
  a second terminal coupler fitted in the connecter, separately from the first terminal connector, electrically connected with the negative (−) terminal member, and coupled with one end of the plug housing.

2. The glow plug of claim 1, wherein the heating unit includes:
 a heating tube coupled to the another end of the plug housing; and
 a coil unit that has one end connected to the center shaft in the heating tube and another end connected to the heating tube.

3. A glow plug fixed to a predetermined plug mount, the glow plug comprising:
 a hollow plug housing mounted on a plug mount, insulated from the plug mount;
 a center shaft fixed to one end of the plug housing, insulated from the plug housing, and receives power from the outside;
 a heating tube coupled to another end of the plug housing;
 a coil unit that has one end connected to the center shaft in the heating tube and another end connected to the heating tube;
 a connector that insulates the plug mount and the center shaft, is coupled to the plug mount, and has integral positive (+) and negative (−) terminal member;
 a first terminal coupler fitted in the connector and coupled between the positive (+) terminal member and another portion of the center shaft, and electrically connecting the positive (+) terminal member and the center shaft; and
 a second terminal coupler fitted in the connecter, separately from the first terminal connector, electrically connected with the negative (−) terminal member, and coupled with one end of the plug housing.

4. The glow plug of claim 3, wherein the plug housing is coupled with the second terminal coupler with a predetermined gap from the inner circumference of the plug mount.

5. The glow plug of claim 4, wherein a spacing that spaces the plug housing is formed at the plug mount.

6. The glow plug of claim 3, wherein one end of the plug housing is coupled to the center shaft through a sealing member.

7. The glow plug of claim 3, wherein the center shaft and the second terminal coupler are insulated by an insulating washer.

8. The glow plug of claim 3, wherein a first elastic deformable portion that elastically presses the center shaft is integrally formed at the first terminal coupler.

9. The glow plug of claim 8, wherein a second elastic deformable portion that elastically presses one end of the plug housing is integrally formed at the second terminal coupler.

10. The glow plug of claim 3, wherein the first terminal coupler is formed in a cylindrical shape and has a first cutting line longitudinally formed to be long in order to apply an elastic force to the connector.

11. The glow plug of claim 10, wherein the second terminal coupler is formed in a cylindrical shape and has a second cutting line longitudinally formed to be long in order to apply an elastic force to the connector.

12. The glow plug of claim 3, wherein a first connection groove connected with the positive (+) terminal member is formed at the first terminal coupler.

13. The glow plug of claim 12, wherein a second connection groove connected with the negative (−) terminal member is formed at the second terminal coupler.

14. The glow plug of claim 3, wherein the coil unit includes a heating coil with one end connected to the heating tube and another end connected to the center shaft.

15. The glow plug of claim 3, wherein the coil unit includes:
 a heating coil connected to the heating tube and generates heat; and
 a temperature control coil connected to the heating coil and the center shaft and controls a heating temperature of the heating coil.

16. An electric thermostat that controls the temperature of a coolant for an engine of a vehicle, the electric thermostat comprising:
 a valve housing connected with a plurality of channels through which the coolant for an engine flows;
 a wax case disposed in the valve housing and has a wax space;
 a glow plug inserted in wax disposed in the wax space and generates heat by receiving power from the outside;
 a driving body that is moved by expansion of the wax due to heat from the glow plug; and
 a valve assembly that opens/closes the channels by the movement of the driving body, wherein the glow plug is electrically connected with the power, insulated from the valve housing, and
 wherein the connecting unit includes:
  a connector integrally coupled to the plug and has integral positive (+) and negative (−) terminal members;
  a first terminal coupler fitted in the connector and coupled between the positive (+) terminal member and another portion of the center shaft, and electrically connecting the positive (+) terminal member and the center shaft; and
  a second terminal coupler fitted in the connecter, separately from the first terminal connector, electrically connected with the negative (−) terminal member, and coupled with one end of the plug housing.

17. The electric thermostat of claim 16, wherein the glow plug includes:
 a cylindrical plug housing mounted on a plug mount integrally formed with the valve housing, in an insulation status;
 a center shaft fixed to one end of the plug housing in an insulation status and receives power from the outside;
 a heating unit connected to the center shaft and another end of the plug housing, and generates heat using a potential difference; and
 a connecting unit that insulates the plug mount and the center shaft, is coupled to the plug mount, and electrically connects with center shaft with the plug housing.

* * * * *